(12) United States Patent
Kempton

(10) Patent No.: US 12,307,477 B2
(45) Date of Patent: May 20, 2025

(54) GENERATING USER POINTS FOR PAYMENT ACTIONS IN PAYMENT PROCESSING SYSTEMS

(71) Applicant: American Express Travel Related Services Company, Inc., New York, NY (US)

(72) Inventor: Devin Robert Kempton, Rye Brook, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 18/480,659

(22) Filed: Oct. 4, 2023

(65) Prior Publication Data

US 2025/0117822 A1   Apr. 10, 2025

(51) Int. Cl.
*G06Q 30/0226* (2023.01)
*G06Q 20/02* (2012.01)
*G06Q 20/10* (2012.01)

(52) U.S. Cl.
CPC ....... *G06Q 30/0226* (2013.01); *G06Q 20/108* (2013.01); *G06Q 20/023* (2013.01)

(58) Field of Classification Search
None
See application file for complete search history.

(56) References Cited

U.S. PATENT DOCUMENTS

| | | | | |
|---|---|---|---|---|
| 2011/0166976 A1* | 7/2011 | Krein | ...... | G06Q 40/00 707/E17.014 |
| 2013/0080270 A1* | 3/2013 | Ronca | ...... | G06Q 20/20 705/16 |
| 2015/0242876 A1* | 8/2015 | Pastore | ...... | G06Q 30/0216 705/14.18 |
| 2020/0118115 A1* | 4/2020 | Zarakas | ...... | G06Q 20/352 |
| 2022/0237602 A1* | 7/2022 | Aaron | ...... | G06Q 20/322 |
| 2023/0196319 A1* | 6/2023 | Ng | ...... | G06Q 20/102 705/39 |

* cited by examiner

*Primary Examiner* — Allan J Woodworth, II
(74) *Attorney, Agent, or Firm* — Thomas | Horstemeyer, LLP

(57) ABSTRACT

Disclosed are various embodiments for generating user points for payment actions applied to an owed balance from eligible payment accounts or source accounts associated with an entity. In some examples, a system comprises a computing device that is configured to receive payment action data from a client device associated with a user identifier. A payment action is identified for an owed balance assigned to the user identifier. The payment action comprises a first identifier for a source account and a second identifier for the owed balance. A common attribute is identified between the first identifier and the second identifier. A payment amount for the payment action is determined to have been held for a threshold time period. The payment amount for the payment action is determined to have been cleared. A user point amount for the user identifier is generated.

20 Claims, 6 Drawing Sheets

GENERATING USER POINTS FOR PAYMENT ACTIONS IN PAYMENT PROCESSING SYSTEMS

BACKGROUND

Payment processing systems are designed to accept payment instruments (e.g., credit cards, debit cards, gift cards, etc.) in order to execute a purchase of an item or a service. Payment processing systems can execute a series of actions among banking systems, payment processors, gateways, and other payment entities. Additionally, payment processing systems can have varying infrastructure according to a payment rail (e.g., card network, cryptocurrency, automated clearing house, etc.).

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
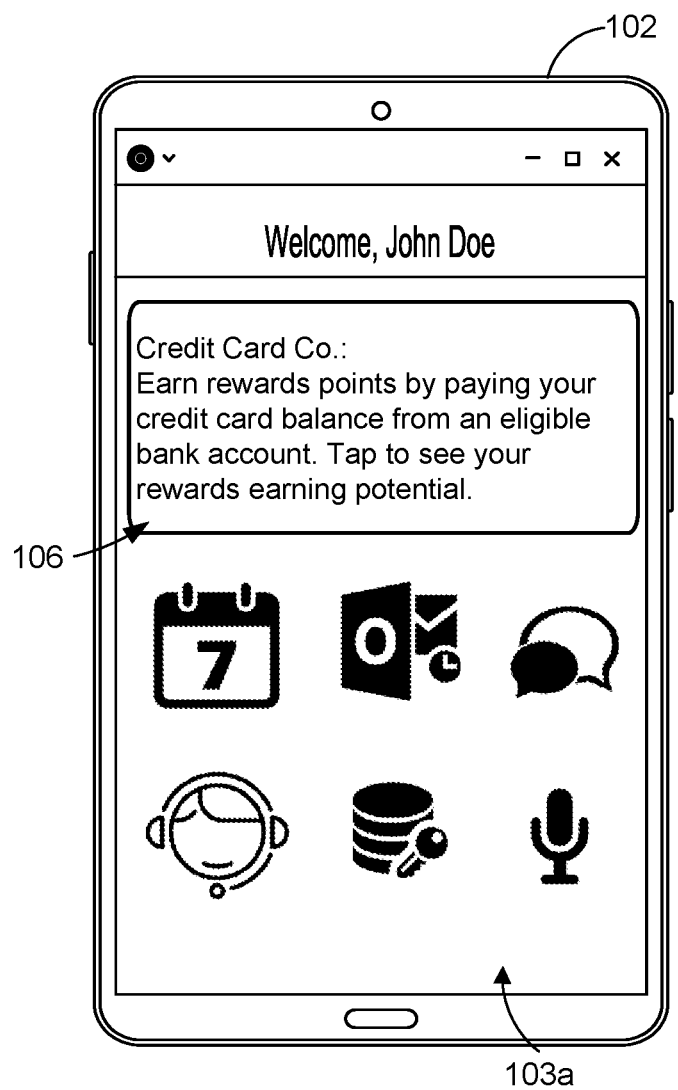
FIGS. 1A-1C are drawings depicting user interfaces displayed on a client device according to various embodiments of the present disclosure.

The various embodiments of the present disclosure relate to generating user points for payment actions applied to an owed balance from eligible payment accounts or source accounts associated with an entity. In some situations, users are incentivized to make purchases with certain payment instruments, such as credit cards, debit cards, etc. By making purchases with certain payment instruments, the user can accrue user points, such as rewards points, loyalty points, and suitable types of credits. However, some entities may desire to incentivize users to pay an owed balance (e.g., a credit card balance, a loan balance, etc.) with certain payment accounts (e.g., a checking account, a savings account, etc.), in which the owed balance and the payment account are associated with the same entity, such as a financial institution.

Various embodiments of the present disclosure relate to systems and methods that enable tracking eligible conditions for users to generate user points by using eligible payment accounts to provide monetary funds to an owed balance, in which the payment accounts and the owed balance are managed by the same financial entity. As such, in some instances, various embodiments of the present disclosure are directed to improvements in payment processing networks by tracking eligible conditions related to payment accounts and owed balance accounts.

For example, a user can have a credit balance for a credit card managed by a financial entity. The financial entity can incentivize the user to pay the credit balance with a banking account also managed by the financial entity. In another example, the user can have a loan balance managed by a financial entity. The user can be incentivized to make payments on the loan balance from a payment account managed by the financial entity.

The financial entity can configure one or more eligibility conditions that indicate the appropriate timing of the payment actions, the appropriate payment or source accounts, the appropriate payment amounts, the appropriate profile data characteristics, and other suitable conditions. Additionally, when payment actions are made that satisfy the eligibility conditions, user points can be generated and accumulated in one or more user point accounts for the user. For example, a system can generate reward points for a user that makes a payment toward a credit balance with an eligible banking account, in which the credit balance and the banking account are owned by the same financial entity.

The various embodiments improve the functionality of payment processing systems. For example, the embodiments of the present disclosure introduce techniques for detecting and tracking eligibility conditions associated with the payment actions. In some instances, the embodiments can notify the user when eligibility conditions are met for making a payment action toward an owed balance. The user can be notified during a payment action workflow, or the user can be notified prior to the start of a payment action workflow, in which the notification prompts a user to start the payment action workflow. In some examples, the embodiments can be directed to identifying a pattern of payment actions by the user and notifying the user of a recommendation for generating user points. For example, the embodiments can detect that the user has a pattern of making payment actions with a non-eligible payment account for an owed balance of an entity. The embodiments can identify the pattern and provide a recommendation for making the payment actions from an eligible payment account associated with the entity.

In some examples, the improvements for the embodiments can be implemented based at least in part on a capability of the payment network. For example, payment processing systems with a closed network arrangement can have issuer banking systems and acquiring banking systems in a single payment network. In this arrangement, the embodiments can improve tracking of payment transactions from a payment action of a user to the payment being applied to an owed balance, such as a credit card balance or a loan balance. Accordingly, in some implementations, a closed payment network can provide additional payment action data that can be useful for tracking eligibility conditions and determining user points.

In some examples, the embodiments can be directed to improved user interfaces for mobile payment systems. The embodiments can be directed to improve the user experience for configuring a payment action. For example, the embodiments can be used to reduce the number of clicks or selections for configuring a payment action. Additionally, the user experience can be improved because the embodiments integrate the user interface functionality of payment actions for an owed balance with the user interfaces directed to accumulating user points.

Further, the embodiments can include user interfaces that provide dynamic real-time feedback on the potential user points that can be generated based at least in part on the entries of a payment action. Accordingly, the user can enter different combinations of payment action data and the user interface can update to indicate how the entries change the calculated user points. In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

As illustrated in FIG. 1A, shown is a client device 102 that displays a first user interface 103a. The first user interface 103a includes a notification 106 that indicates that the user is eligible for generating user points for making a payment towards an owed balance from an eligible payment accounts.

In the example scenario shown in FIG. 1A, the notification 106 indicates that the user is eligible for earning user points by executing a payment action from an eligible source account (e.g., payment account) toward an owed balance. In this example, the notification 106 is generated and displayed in the first user interface 103a because the user of the client device 102 has met one or more eligibility conditions. For instance, the system has determined that the user has an owed balance (e.g., credit card balance). Further, the system can determine the user also has a banking account with sufficient funds for making a payment toward the owed balance. In some instances, the system can determine whether the funds in the banking account have been held in the banking account for a minimum amount of time to qualify for earning user points. Other suitable eligibility conditions can be implemented.

The notification 106 can include a deep link for directing the user to an advanced stage of a payment action workflow, which can reduce the number of selections and/or entries of data for executing the payment action workflow. A deep link can be a type of hyperlink that directs a client device to a specific client application location (e.g., a specific user interface of the client application). The deep link can save the user the time and energy of locating a particular page and entering data into user interfaces. The deep links have a uniform resource locator scheme that is associated with a specific client application. For instance, the selection of the notification 106 can cause the activation of the deep link. The deep link can direct the first user interface 103a to update to display another user interface (e.g., FIG. 1B), which can populate data associated with the user and other context data. The activation of the deep link can cause a client application to execute a set of instructions associated with populating data in the next user interface in order to reduce the amount of data that is needed to be entered by the user. As such, the payment action workflow can be completed in less time by the user clicking the notification 106.

Figure 1B:
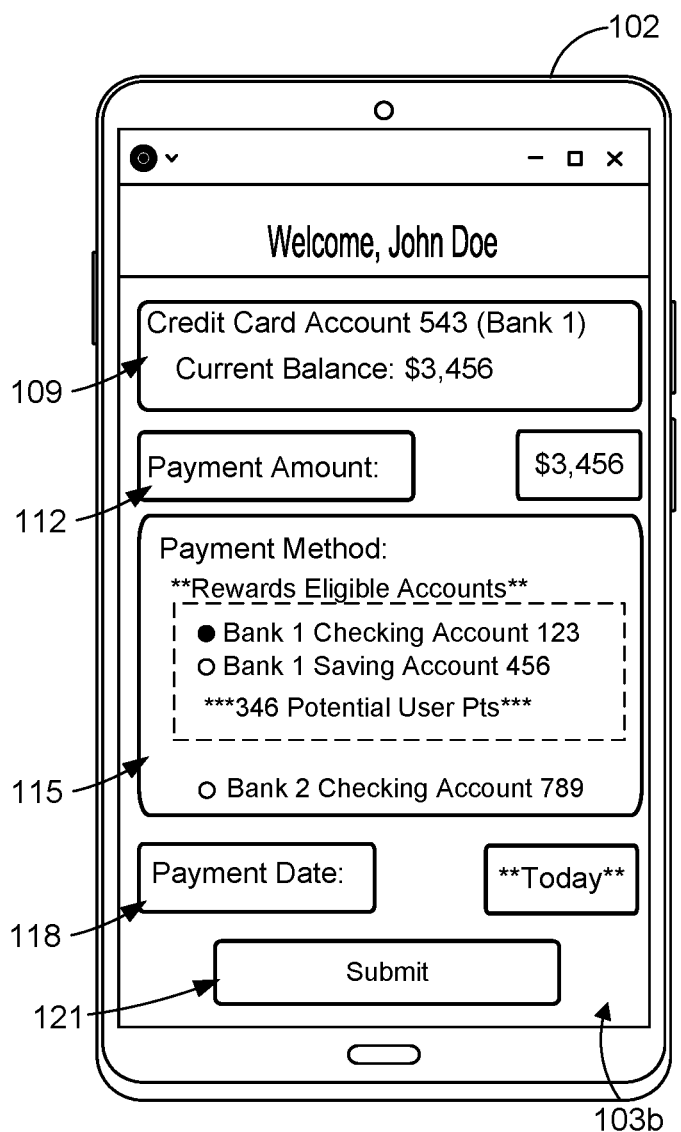

Next, FIG. 1B illustrates a second user interface 103b for initiating a payment action with an entity. The second user interface 103b can include an owed balance section 109, a payment amount section 112, a payment account section 115, a payment date section 118, and other suitable components. The owed balance section 109 can include one or more owed balances that are associated with a user. For example, the owed balance section 109 can display a current balance of a credit card account, a loan balance, and/or other suitable owed accounts. The owed balances can be managed by a financial entity.

In some examples, upon the activation of the notification 106, a client application can select an owed balance in the event there are multiple owed balances. The selection of the owed balance can be based at least in part on one or more eligibility conditions satisfied by the user profile data associated with the user. In the event a selection has been made, the user can override the selection by manually selecting another owed balance. Upon receiving a manual selection, the second user interface 103b can dynamically indicate whether the selection qualifies for generating user points for the users. For example, the second user interface 103b can dynamically generate text characters, display visual indicators, audible feedback prompt, tactile feedback, or other feedback indicators for notifying the user whether the selection qualifies for generating user points.

The payment amount section 112 can represent a section for receiving a payment amount for the payment action. The user can enter an amount in a range from zero to the current amount of the owed balance. In some examples, the payment amount section 112 can be populated with a recommended amount to maximize the user points generated by the user. Other payment amounts can be recommended based at least in part on one or more settings configured by the user.

The payment account section 115 can represent a section for receiving a payment method, such as a source account. The user can select at least one of the listed source accounts for the payment action. In some examples, the client application can select a source account for the user based at least in part on one or more eligibility conditions. As shown in FIG. 1B, the client application can indicate which source account are eligible for user points, as shown in the "Rewards Eligible Accounts" area. In some embodiments, the client application can indicate that the source accounts are eligible based at least in part on a first entity managing the source account matches a second entity managing the owed balance.

In some embodiments, the client application can calculate a quantity of user points that can be generated if one of the eligible payment accounts are selected. The potential user points can be displayed in the payment account section or other areas of the second user interface 103b.

The payment date section 118 can represent a date for executing the payment action. In some examples, the entity can configure for monetary funds in the payment account to be held for a threshold time period. As such, the client application can dynamically indicate whether the displayed payment date complies with the threshold time period. After the second user interface 103b has been filled out for the payment action, a user can select a submit component 121 for transmitting the payment action to a remote payment processing computing device.

Figure 1C:
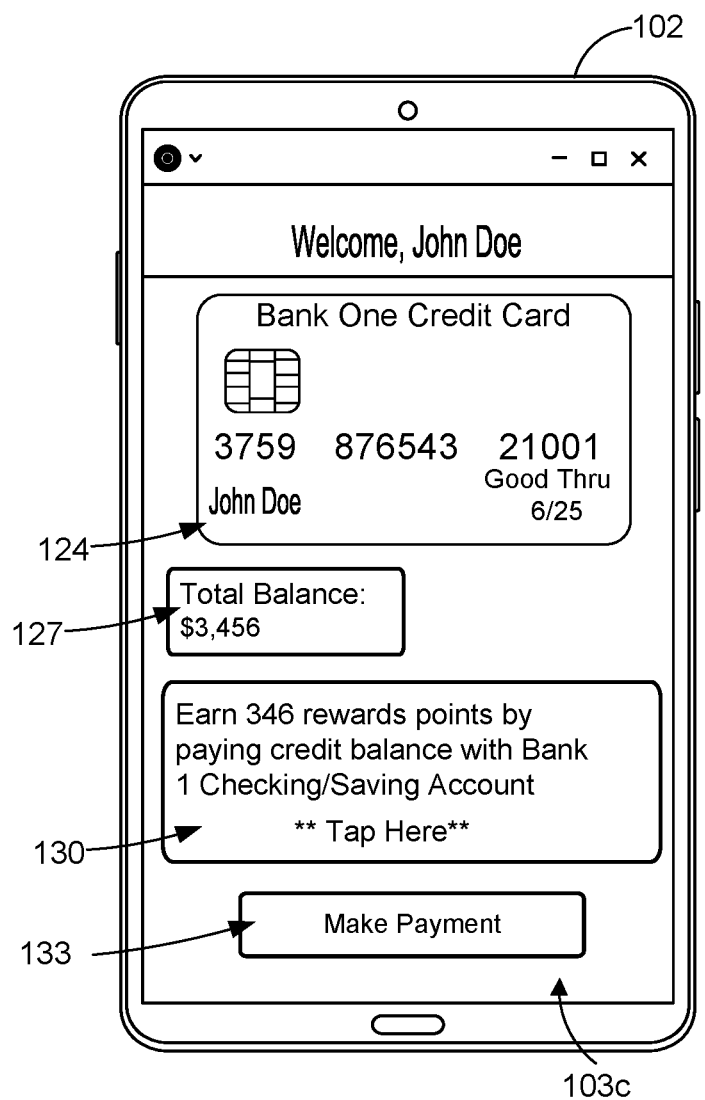

Moving on to FIG. 1C, shown is a third user interface 103c that provides a dashboard overview of user profile data for the user. The third user interface 103c displays a payment instrument section 124 associated with the user, an owed balanced section 127 for the above-displayed payment instrument, a dashboard notification 130, a make payment component 133, and other suitable components.

The payment instrument section 124 associated with the user can display information related to one or more payment instruments, such as a card identifier (e.g., a credit card number, a debit card number, a gift card number, etc.), verification data (e.g., a code verification value, a code verification code), card holder name, expiration data, and other suitable information.

The owed balanced section 127 can display an owed balance for the above-displayed payment instrument. When a user has multiple owed balances, the user can select a certain payment instrument or loan account. Once selected, the owed balance section 127 can be dynamically updated to display the current balance for the selected payment instrument or selected loan account.

The dashboard notification 130 can represent a section for notifying the user about potential user points that can be earned for selecting an eligible source account to pay at least a portion of the owed balance. In this example, by selecting the dashboard notification 130, the third user interface 103c can transition to the second user interface 103b, which enables the user to enter data for a payment action.

In some example scenarios, the user may not currently have an eligible source account. In these scenarios, the dashboard notification can indicate that the user is qualified to open a financial account (e.g., checking account, saving account, brokerage account, or other suitable accounts, etc.). In this example, by selecting the notification, a client application can transmit a data request to a remote computing device for another user interface for enrolling the user in opening a source account with the entity. The make payment component 133 can be a user interface component that causes the third user interface 103c to transition to the second user interface 103b for entering data for a payment action.

Figure 2:
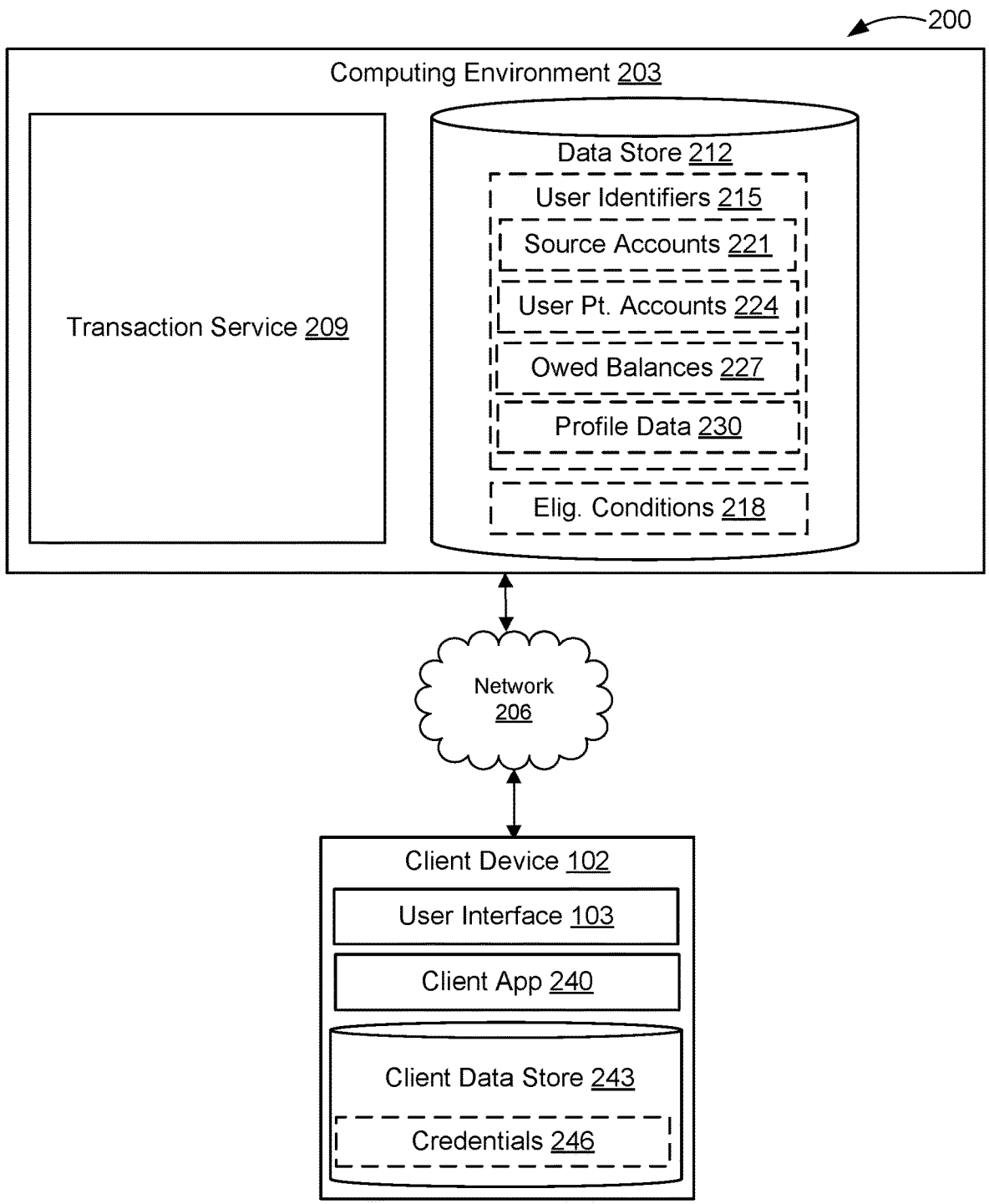
FIG. 2 is a drawing of a network environment according to various embodiments of the present disclosure.

With reference to FIG. 2, shown is a network environment 200 according to various embodiments. The network environment 200 can include a computing environment 203, and a client device 102, which can be in data communication with each other via a network 206.

The network 206 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 206 can also include a combination of two or more networks 206. Examples of networks 206 can include the Internet, intranets, extranets, virtual private networks (VPNs), and similar networks.

In various examples, the network 206 can include a payment network for facilitating a processing of a payment. The payment network can include an open network or a closed loop network. The open network may be a network that is accessible by various third parties and/or a network in which banking systems from different entities interact. Alternatively, the network 206 can also be a closed loop network. For example, the closed loop network can include issuer bank systems and acquiring bank systems, in which third parties can be restricted from accessing the closed loop network. For instance, a single financial entity can have the issuing banking systems and the acquiring banking systems in a single payment network. In this scenario, the single financial entity has payment data related to the payment accounts for individual users and the payment processing data related to merchant accounts and/or owed balance operators.

The computing environment 203 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 203 can employ a plurality of computing devices that can be arranged in one or more server banks or computer banks or other arrangements. Such computing devices can be located in a single installation or can be distributed among many different geographical locations. For example, the computing environment 203 can include a plurality of computing devices that together can include a hosted computing resource, a grid computing resource or any other distributed computing arrangement. In some cases, the computing environment 203 can correspond to an elastic computing resource where the allotted capacity of processing, network, storage, or other computing-related resources can vary over time.

Various applications or other functionality can be executed in the computing environment 203. The components executed on the computing environment 203 include transaction service 209, and other applications, services, processes, systems, engines, or functionality not discussed in detail herein. The transaction service 209 can be executed to coordinate the operations related to incentivizing a user to make payment actions for an owed balance from eligible source accounts, in which the owed balance and the source account are associated with an entity. The eligible source accounts can be based at least in part on the user having an owed balance that is also associated with the entity. The transaction service 209 can be in data communication with the client device 102 for retrieving payment action data and transmitting user interface data. In some examples, the transaction service 209 can access data from acquiring banking systems and issuer banking systems for tracking payment actions from eligible source accounts and for tracking the payments being directed to an owed balance account.

Also, various data is stored in a data store 212 that is accessible to the computing environment 203. The data store 212 can be representative of a plurality of data stores 212, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 212 is associated with the operation of the various applications or functional entities described below. This data can include user identifiers 215, eligibility conditions 218, and potentially other data.

The user identifiers 215 can represent a unique identifier of a user at an entity. The user identifier 215 can be associated with a user account, a user profile, or other suitable methods for grouping user data. The user identifier 215 can include source accounts 221, user point accounts 224, owed balances 227, profile data 230, and/or other suitable user data.

The source accounts 221 can represent data for one or more financial accounts that can be selected as a source of funds (e.g., payment account) for a payment action. The source account 221 can include a routing number at an entity (e.g., a financial institution), an account number at the entity, and/or other suitable identifiers. In some examples, the routing number can be useful for identifying an entity (e.g., a banking entity) and the account number can be useful for identifying a user-specific account at the entity. In some examples, the routing number and/or the account number can be representative of an identifier for a source account. In some examples, the routing number and/or the account number can be used to identify common attributes between a source account 221 and the owed balance 227.

These source accounts can have the user of the user identifier 215 as an account owner. In some examples, source accounts 221 can be eligible for generating user points for the user identifier 215 based at least in part on one or more eligibility conditions 218. In some embodiments, the source accounts 221 are associated with or accessed from an issuing banking system in the computing environment 203.

The user point accounts 224 can represent data for one or more accounts associated with the user identifier 215 for accumulating user points, such as reward points, loyalty points, credits, and other forms of user credit at an entity. In some examples, the user can generate or earn user points by completing payment actions that satisfy one or more eligibility conditions 218.

In some implementations, the user point accounts 224 can be associated with a decentralized identifier of a decentralized identity system. The decentralized identify system can include a distributed ledger (e.g., a blockchain) that stores transactions associated with the decentralized identifier. In some examples, the user can use a verifiable credential for authenticating a payment action and/or for associating the payment action with the user identifier 215 and/or the decentralized identifier. The transaction service 209 can issue a verifiable credential to the user identifier 215 during a registration process.

The owed balances 227 can represent data for one or more account balances that have an owed amount associated with the user identifier 215. For example, an owed balance at an entity (e.g., a financial institution) can include a credit balance for a credit card account, a charge account, a loan balance, and other owed balance accounts. In some examples, in order to generate user points, the owed balance 227 and the source account 221 (e.g., the source account for a payment) have to be managed by the same entity (e.g., banking institution). In some embodiments, the owed balances 227 are associated with or accessed from an acquiring banking system in the computing environment 203. In some examples, various account identifiers of the owed balance 227 can be used to identify common attributes between the owed balance 227 and a source account 221.

The profile data 230 can include various data elements associated with the user identifier 215 of the user. The profile data 230 can include a name, contact information, user classification data (e.g., spendability classification, risk classification, credit classification, etc.), user interface viewing data, user patterns and trends for performing payment actions, a device identifier for a client device 102 associated with the user identifier 215, and other suitable profile data 230.

The eligibility conditions 218 can represent one or more conditions that determine whether a user can generate user points for a payment action. The eligibility conditions 218 can include identifying eligible source accounts 221 managed by a particular entity, identifying owed balances managed by the particular entity, qualifying user identifiers 215 based at least in part on profile data 230, timing conditions of payment actions, and other suitable conditions.

The client device 102 is representative of a plurality of client devices that can be coupled to the network 206. The client device 102 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 102 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 102 or can be connected to the client device 102 through a wired or wireless connection.

The client device 102 can be configured to execute various applications such as a client application 240 or other applications. The client application 240 can be executed to facilitate payment actions that generate user points for a user identifier 215. The client application 240 can be in data communication with the transaction service 209. The client application 240 can transmit and receive data from the transaction service 209 related to payment actions, user interface functionality, and other suitable functionality. Additionally, the client application 240 can be executed in a client device 102 to access network content served up by the computing environment 203 or other servers, thereby rendering one or more user interfaces 103a-c (collectively user interfaces 103a-c are referenced as "user interface 103") on the display. To this end, the client application 240 can include a browser, a dedicated application, or other executable, and the user interface 103 can include a network page, an application screen, or other user mechanism for obtaining user input. The client device 102 can be configured to execute applications beyond the client application 240 such as email applications, social networking applications, word processors, spreadsheets, or other applications.

Also, various data is stored in a client data store 243 that is accessible to the client device 102. The client data store 243 can be representative of a plurality of client data stores 243, which can include relational databases or non-relational databases such as object-oriented databases, hierarchical databases, hash tables or similar key-value data stores, as well as other data storage applications or data structures. The client data store 243 can also include secure elements for storing confidential data in tamper-resistant memory locations.

The client data store 243 can include credentials 246 and other suitable client data. The credentials 246 can represent data for identify authentication, data authorization, and other suitable credential data. Some non-limiting examples of credentials 246 can include a username, password, a private key, a digital signature generated from a private key of the client device 102, a verifiable credential associated with a decentralized identifier for the user, and other suitable credentials. In some examples, the credentials 246 can be stored in a secure element.

Next, a general description of the operation of the various components of the network environment 200 is provided. To begin, a user can register with a financial institution (e.g., a bank, a credit card company, credit union, etc.) in order to open a source account 221 (e.g., a checking account, a saving account, a gift card account, etc.). Subsequently, the user can open an owed balance 227 (e.g., a credit card account, a loan account, etc.) at the same financial institution. Overtime, the user can make purchases that are charged to the owed balance 227. In other scenarios, the user can receive a loan for the owed balance 227 (e.g., a loan account).

In some examples, when a payment action is initiated for making a payment for the owed balance 227, the transaction service 209 can determine whether one or more eligibility conditions 218 are met for generating the user points. If the eligibility conditions 218 are met, then the transaction service 209 can generate and store user points in a user point accounts 224 for the user identifier 215.

In some examples, the user may have a pattern of paying the owed balance 227 with a source account 221 that is associated with another financial institution. The transaction service 209 can recognize the pattern for the user based at least in part on periodically determining whether one or more eligibility conditions 218 are satisfied. For example, the transaction service 209 can determine over many time intervals that the user identifier 215 has an owed balance 227, has an eligible source account 221, whether the eligible source account 221 was used for a payment action for the owed balance, an average monthly amount for the owed balance 227 that is higher than a balance threshold, and other suitable conditions. If the eligibility conditions are satisfied over a threshold number of intervals, the transaction service 209 can cause a notification 106 to be sent to the client, where the notification recommends using the eligible source account 221.

In some examples, in response to evaluating the eligibility conditions 218, the transaction service 209 can identify one or more other deficiencies for failing to meet the eligibility conditions 218. For example, the transaction service 209 can identify that the source account 221 does not have sufficient monetary funds or the monetary funds have not been held in the source account 221 for a sufficient amount of time. Accordingly, the transaction service 209 transmit a notification (e.g., FIG. 1A (106)) to the client device 102. The notification can indicate that the user can earn user points if the user corrects one or more deficiencies identified by the transaction service 209.

In some examples, the transaction service 209 can receive payment action data from the client device 102. The payment action data can be generated by the client device 102 based at least in part on data received from one or more user interfaces 103. From the received payment action data, the transaction service 209 can identify a payment action.

The transaction service 209 can determine or verify if an eligible source account 221 is included in the payment action. If there is an eligible source account 221, the transaction service 209 can determine if the payment amount for the payment action has been held in the source account 221 for a threshold time period at the entity. For example, the transaction service 209 can determine if the monetary funds in a banking account have been held in a financial institution for a certain threshold time period.

If the payment amount meets the threshold time period, then the transaction service 209 can proceed to process the payment action for the owed balance 227. Additionally, the transaction service 209 can identify whether the payment action has been cleared and settled. Then, the transaction service 209 can generate user points for a user point account 224 of the user identifier 215. The transaction service 209 can generate the user points based at least in part on one or more conditions. For example, the transaction service 209 can generate the user points based at least in part on the payment amount for the payment action and a conversion rate. In some instances, the conversion rate can be determined based at least in part on one or more data elements associated with the user identifier 215.

Further, in some embodiments, the client application 240 can be executed in the client device 102 to determine whether eligibility conditions 218 are satisfied on a periodic interval, upon demand, upon a triggering event, or other timing conditions. If the eligibility conditions 218 are not met, the client application 240 can display a notification for informing the user of the deficiencies that are preventing the user from generating user points.

If the eligibility conditions 218 are satisfied, the client application 240 can display a notification that indicates that the user qualifies for generating user points associated with payment actions. If the notification is selected, the client application 240 can activate a deep link for advancing the user through a payment action workflow.

In some examples, the client application 240 can transmit a credential (e.g., a username, password, a digital signature generated from a private key, a verifiable credential associated with a decentralized identifier for the user) to the transaction service 209 to authenticate the identity of the user. In some instances, the credential is submitted to a distributed ledger for storing and/or accessing the user points (e.g., user point transactions) at a user point account 224 associated with the distributed ledger.

Figure 3:
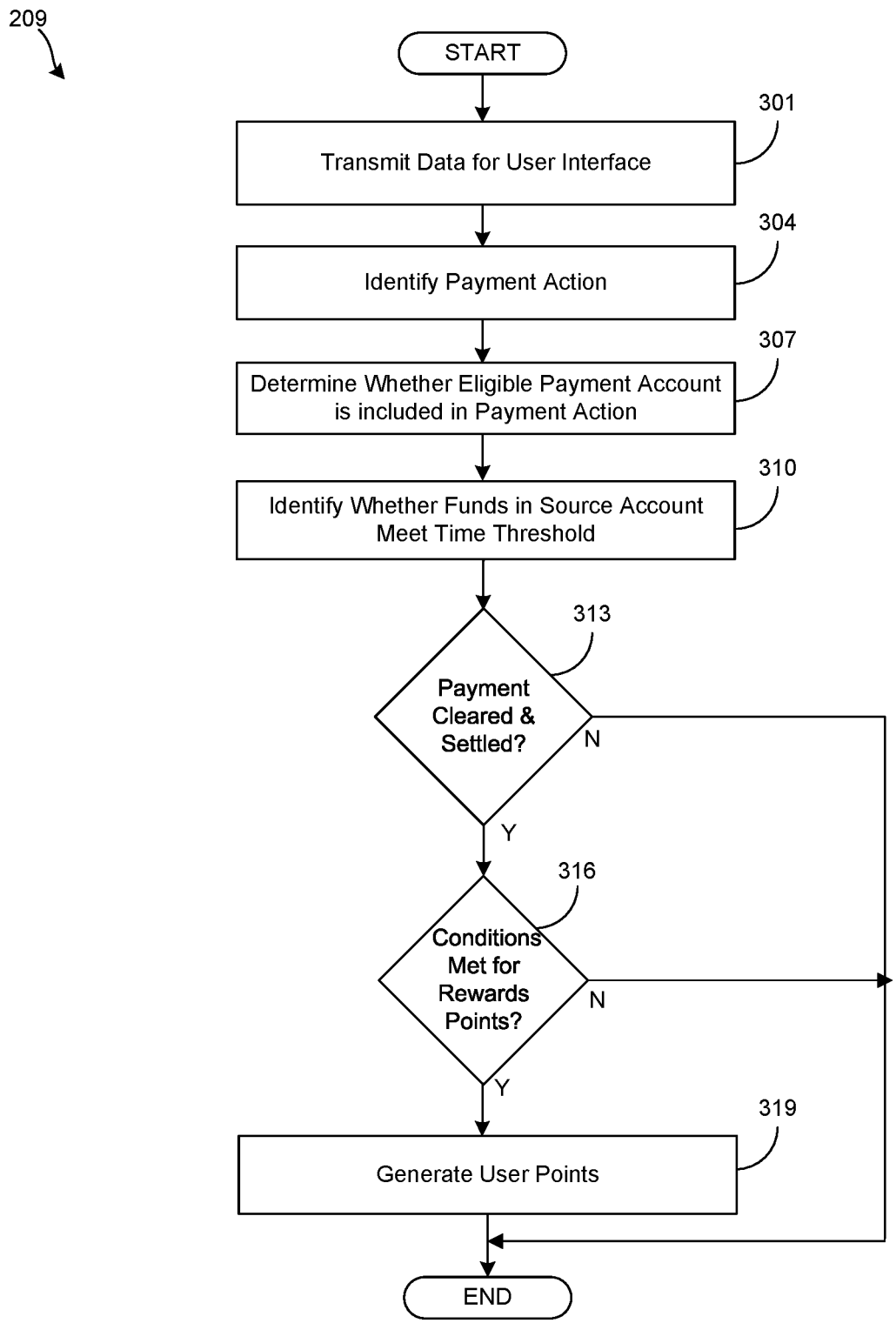
FIG. 3 is a flowchart illustrating one example of functionality implemented as portions of an application executed in a computing environment in the network environment of FIG. 2 according to various embodiments of the present disclosure.

Referring next to FIG. 3, shown is a flowchart that provides one example of the operation of a portion of the transaction service 209. The flowchart of FIG. 3 provides merely an example of the many different types of functional arrangements that can be employed to implement the operation of the depicted portion of the transaction service 209. As an alternative, the flowchart of FIG. 3 can be viewed as depicting an example of elements of a method implemented within the network environment 200.

Beginning with block 301, the transaction service 209 can transmit data for one or more user interfaces 103 to the client device 102. In some examples, the use interface data is transmitted to the client device 102 in response to receiving a request from the client device 102 for one of the user interfaces 103.

For instance, the transaction service 209 can receive a request for user interface data from the client device 102 because of a selection of a notification displayed on the client device 102 (e.g., see. FIG. 1A). In another instance, the client application 240 can request user interface data for displaying a user interface 103 because the client application 240 was selected for execution. In other instances, the client application 240 can request user interface data because of the selection of one or more user interface components.

In some instances, the transaction service 209 can authenticate the user identifier 215 and/or the client device 102 based at least in part on a credential 246 provided by the client device 102. Upon successful authentication, the transaction service 209 can transmit to the client device 102 user interface data, data associated with the user identifier 215 (e.g., source accounts 221, user point accounts 224, owed balances 227, profile data 230, etc.), eligibility conditions 218 associated with the user identifier 215, and other suitable data.

At block 304, the transaction service 209 can identify a payment action from data sent by the client device 102 because of one or more user interfaces 103. For example, the transaction service 209 can receive payment action data from the client device 102. The client device 102 can generate payment action data from the user entering the payment action data, as shown in FIG. 1B for example. The transaction service 209 can extract one or more data parameters from the payment action data transmitted by the client device 102.

At block 307, the transaction service 209 can determine whether an eligible source account 221 is included in the payment action. In some examples, the transaction service 209 can receive the payment action data and can extract a parameter related to the source account 221. For example, one or more parameters can include an identifier for a source account 221, which may include a routing number, a banking account number, a temporary account number (e.g., a gift card account), and other suitable financial account identifiers.

In some examples, the transaction service 209 can determine or confirm whether a source account 221 is eligible for generating user points by identifying whether a common data attribute exists between the source account 221 and the owed balance 227. For example, a routing number of the identifier for the source account 221 can be used to identify the first entity. In other examples, other aspects of the identifier of the source account 221 can be used for entity identification. Subsequently, the transaction service 209 can compare the first entity to a second entity associated with the owed balance 227. If the first entity and the second entity match, then the source account 221 can be an eligible source account 221. In some examples, if the payment account is an eligible source account 221, then the transaction service 209 can apply an eligible account label or flag with respect to the eligibility condition 218. If the first entity and the second entity do not match, then the source account 221 is not an eligible source account 221.

At block 310, the transaction service 209 can identify whether the funds for the payment action have been held in the source account 221 for a minimum threshold time period. The transaction service 209 can identify a payment amount associated with the payment action. The transaction service 209 can determine whether the payment amount has been held in the source account 221 at the entity for at least a threshold time period. For example, if the user has requested to make a payment of $100, the transaction service 209 can check to determine whether source account 221 had a balance of at least $100 for a minimum time period (e.g., sixty days). In some examples, if the payment amount has met the threshold time period, then the transaction service 209 can apply an eligible funds label or flag with respect to the eligibility condition 218. The transaction service 209 can proceed to execute the payment action.

At block 313, the transaction service 209 can determine whether the payment action has been cleared and whether the payment action has been settled. If no, the transaction service 209 can proceed to the end. If yes, the transaction service 209 can proceed to block 316.

At block 316, the transaction service 209 can determine whether the eligibility conditions 218 have been met by the payment action data. In some examples, the transaction service 209 can check the eligibility conditions 218 by identifying if the eligible account label and the eligible funds label are indicated. If no, the transaction service 209 proceeds to the end. If yes, the transaction service 209 proceeds to block 319. In some embodiments, blocks 307 and 310 can be omitted because the associated functionality can be implemented in block 316.

The eligibility conditions 218 can include criteria that determine whether the payment action data are met for generating user points. In some examples, the eligibility conditions 218 can be used to determine a conversion rate for generating the user points. Some users may qualify for a higher conversion rate than others based at least in part on the eligibility conditions 218. For example, the eligibility conditions 218 may be used to select a user classification among multiple user classifications. Each user classification can be associated with a different conversion rate for generating user points.

Some non-limiting examples of eligibility conditions 218 can include determining whether an eligibility source account 221 is included, whether the payment amount meets a threshold time period, whether a balance amount in the source account 221 meets a threshold, user credit history, user spending history, and other suitable conditions.

At block 319, the transaction service 209 can generate user points for the user identifier 215 associated with the payment action. The transaction service 209 can generate the user points based at least in part on the payment amount for the payment action and a conversion rate. For example, if the payment amount is $100 for an owed balance 227, the transaction service 209 can multiply the payment amount of $100 by the conversion rate of 10 points per $1 of the payment amount. Thus, the transaction service 209 would determine the payment action generated 1,000 user points for the payment action.

The transaction service 209 can identify the user point account 224 associated with the user identifier of the payment action. The transaction service 209 can add the 1,000 user points to the user point account 224. In some instances, the transaction service 209 can transmit a user point transaction to a distributed ledger (e.g., a blockchain) based at least in part on a decentralized identifier for the user. Then, the transaction service 209 can proceed to the end.

Figure 4:
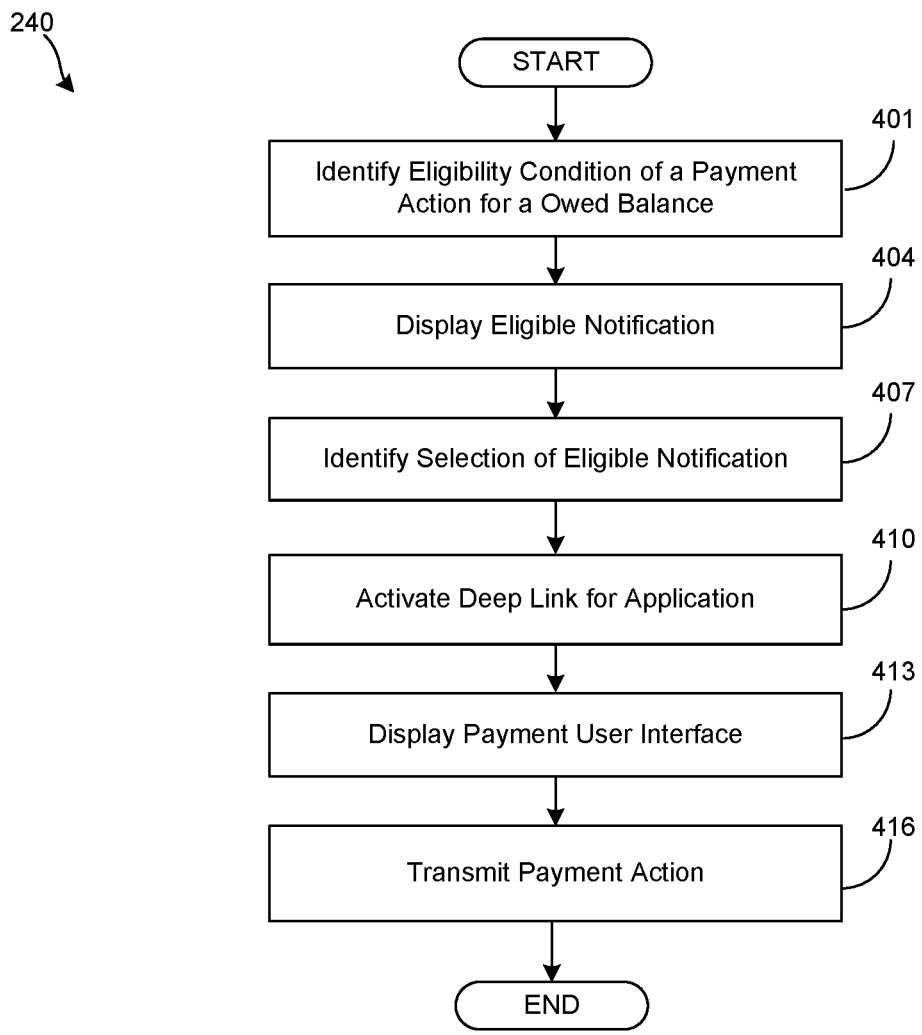
FIG. 4 is a flowchart illustrating one example of functionality implemented as portions of an application executed in a client device in the network environment of FIG. 2 according to various embodiments of the present disclosure.

Turning now to FIG. 4, shown is a flowchart illustrating one example of functionality implemented as portions of the client application 240 executed in a computing environment 203 in the network environment 200. The flowchart of FIG. 4 provides merely an example of the many different types of functional arrangements that can be employed to implement the operation of the depicted portion of the client application 240. As an alternative, the flowchart of FIG. 4 can be viewed as depicting an example of elements of a method implemented within the network environment 200.

At block 401, the client application 240 can identify eligibility conditions 218 for a potential payment action that can be applied to an owed balance 227. The client application 240 can check the eligibility conditions 218 prior to the user initiating a payment action workflow (e.g., prior to displaying the user interfaces 103). For example, the client application 240 can check the eligibility conditions 218 as a background computing processing thread.

In other examples, the client application 240 can receive data from the transaction service 209 indicating one or more eligibility conditions have been met. For example, the client application 240 can receive an instruction from the transaction service 209 to display an eligible notification on the client device 102 for recommending the user initiate a payment action workflow that includes an eligible source account 221.

The eligibility conditions can be a set of conditions for determining when a user identifier 215 qualifies for generating user points for a payment action. For example, one eligibility condition 218 can include checking whether the user identifier 215 has an eligible source account 221, in which the eligible source account 221 is associated with a first entity that matches a second entity of an owed balance for the user identifier 215. Another eligibility condition 218 can include determining whether the eligible source account 221 has held a monetary amount at least a threshold amount of time. Other eligibility conditions 218 can include user credit, user purchasing history, user income, and other suitable conditions.

In some scenarios, the client application 240 can detect that the user has one or more deficiencies for meeting the eligibility conditions 218. In this scenario, the client application 240 can identify parameters or data elements that the user identifier 215 needs to meet in order to qualify for generating user points with the transaction service 209. For example, the client application 240 and/or the transaction service 209 can identify that the user identifier 215 does not have an eligible source account 221 with an entity, but the user identifier 215 does have an owed balance 227. In this example, the client application 240 can be notified to open an eligible source account 221 with the entity, which can enable the user identifier 215 to qualify for generating user points from eligible payment actions applied to an owed balance.

At block 404, the client application 240 can display an eligible notification on the user interface 103 of the client device 102. In some scenarios, the client application 240 can determine to display an eligible notification based at least in part on the client application 240 determining the eligibility conditions 218 have been met. In other scenarios, the eligible notification can be displayed in response to an instruction from the transaction service 209, in which the transaction service 209 determined that the eligibility conditions 218 have been met.

In some instances, the client application 240 can determine an appropriate time for displaying the eligible notification based at least in part on profile data 230 associated with the user identifier 215 of the client device 102. For example, the client application 240 can determine an appropriate time to display the eligible notification based at least in part on user interface viewing patterns, client application usage data from the profile data 230, or other suitable conditions. For example, the client application 240 can identify that the user has a pattern of viewing the client application 240 every morning between 8:00 AM-8:30 AM. As such, the client application 240 can determine to display the eligible notification based at least in part on the pattern of the user viewing the client application 240 every day between 8:00 AM and 8:30 AM. By displaying notifications based on viewing patterns, the client application 240 can increase the likelihood of the user viewing and selecting the eligible notification.

At block 407, the client application 240 can identify a selection of the eligible notification. As previously described, different types of eligible notifications can be generated to achieve different purposes. As such, the eligible notification can include deep links that direct the client application 240 to different user interfaces 103 based at least in part on the eligibility conditions 218 that were satisfied for generating the eligible notification.

In some instances, the eligible notification can include a deep link for advancing the client application 240 to a payment user interface 103 (e.g., see FIG. 1B (103b)), in which one or more user interfaces 103 may be skipped in order to reduce the time needed to complete the payment action workflow. In other instances, the eligible notification can include a deep link for opening an eligible source account 221 or other suitable aspects with the transaction service 209.

At block 410, the client application 240 can activate a deep link for the client application 240. In some examples, the eligible notification can include a deep link for advancing the client application 240 to a user interface 103 for setting up a payment action. In this context, the deep link can include a reference (e.g., application interface reference, a website hyperlink, etc.) to a user interface 103 associated with the client application 240 and the deep link can include instructions for populating data elements into the user interface 103. For example, the instructions can direct the client application 240 to retrieve and insert one or more of the following into the user interface 103: an eligible source account 221, a payment amount, a payment date, and other suitable data elements for a payment action.

At block 413, the client application 240 can display a payment user interface 103 on the client device 102. In some examples, the client application 240 can display eligibility indicators in the user interface 103 (e.g., see FIG. 1B). The eligibility indicators can provide a visual or audible indication for appropriate selections and data entry for earning user points for a payment action. For instance, if there are multiple source accounts 221 for a user identifier 215, the user interface 103 can indicate which of the source accounts 221 are eligible for generating user points. As such, the client application 240 can identify all available source accounts 221 for the user identifier 215 and can identify which among the available payment accounts 221 are eligible source accounts 221 for generating user points for the user identifier 215.

Further, in some examples, the client application 240 can verify valid data is entered into the data entry field, which would qualify for generating user points. The user interface 103 can dynamically update in response to data entries that would either qualify for generating user points or would not qualify for generating user points.

In addition, in some examples, the client application 240 can calculate a quantity of potential user points that can be generated by a payment action. The potential user points can be calculated based at least in part on the selected source account 221 and other data entered into the user interface 103 (e.g., payment amount, payment date). In other instances, the client application 240 indicates data parameters for generating a maximum quantity of user points at the current instance in time.

At block 416, the client application 240 can transmit the payment action (e.g., as payment action data) to the transaction service 209. In some instances, the client application 240 can receive confirmation data from the transaction service 209. The confirmation data can indicate that the payment action has cleared and has been settled. The confirmation data can also indicate that user points have been awarded to the user point account 224. Then, the client application 240 can proceed to the end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random-access portion of the memory and run by the processor, source code that can be expressed in proper format such as object code that is capable of being loaded into a random-access portion of the memory and executed by the processor, or source code that can be interpreted by another executable program to generate instructions in a random-access portion of the memory to be executed by the processor. An executable program can be stored in any portion or component of the memory, including random-access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random-access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagram of FIG. 3 and the flowcharts of FIGS. 4 and 5 show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagram of FIG. 3 and the flowcharts of FIGS. 4 and 5 show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the sequence diagram of FIG. 3 and the flowcharts of FIGS. 4 and 5 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random-access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 203.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
machine-readable instructions stored in the memory that, when executed by the processor, cause the computing device to at least:
determine a user identifier meets an eligible condition associated with an owed balance associated with the user identifier;
transmit to a client device of the user identifier a notification that includes a deep link for directing the client device to display a user interface based at least in part on the user identifier meeting the eligible condition, the deep link comprising an instruction for retrieving payment action data associated with the user identifier to be pre-populated into the user interface, wherein the client device is configured to receive a selection of the deep link from the notification and activate the deep link in response to the selection, wherein in response to the activation of the deep link, the client device causes a client application to pre-populate the payment action data in the user interface;
receive the payment action data from the client device associated with the user identifier;
identify a payment action for the owed balance assigned to the user identifier based at least in part on the payment action data, the payment action comprising a first identifier for a source account and a second identifier for the owed balance;
identify a common attribute between the first identifier and the second identifier based at least in part on the payment action;
determine that a payment amount for the payment action has been held for a threshold time period at an entity;
determine that the payment amount for the payment action has cleared at the entity; and
generate a user point amount for the user identifier based at least in part on the payment amount being cleared, the identification of the common attribute, and the threshold time period being met.

2. The system of claim 1, wherein the machine-readable instructions further cause the computing device to at least:
add the user point amount to a user point account for the user identifier.

3. The system of claim 1, wherein the user point amount is generated based at least in part on a conversion rate associated with the user identifier.

4. The system of claim 3, wherein the machine-readable instructions further cause the computing device to at least:
identify a user classification for the user identifier; and
determine the conversion rate based at least in part on the user classification.

5. The system of claim 1, wherein the machine-readable instructions further cause the computing device to at least:
receive a payment request from a client device associated with the user identifier;
determine that a plurality of source accounts associated with the user identifier and the plurality of source accounts have the common attribute; and
transmit the plurality of source accounts to the client device for display.

6. The system of claim 1, wherein the machine-readable instructions further cause the computing device to at least:
determine that the user identifier has a user point account in response to the payment request.

7. The system of claim 1, wherein the common attribute is a routing identifier of the entity, wherein the first identifier comprises the routing identifier and the second identifier comprises the routing identifier.

8. A method, comprising:
determining, by at least one computing device, a user identifier meets an eligible condition associated with an owed balance associated with the user identifier;
transmitting, by the at least one computing device, to a client device of the user identifier a notification that includes a deep link for directing the client device to display a user interface based at least in part on the user identifier meeting the eligible condition, the deep link comprising an instruction for retrieving payment action data associated with the user identifier to be pre-populated into the user interface, wherein the client device is configured to receive a selection of the deep link from the notification and activate the deep link in response to the selection, wherein in response to the activation of the deep link, the client device causes a client application to pre-populate the payment action data in the user interface;
identifying, by the at least one computing device, a payment action for the owed balance assigned to the user identifier based at least in part on the payment action data received from the client device, the payment action comprising a first identifier for a source account and a second identifier for the owed balance;
identifying, by the at least one computing device, a common attribute between the first identifier and the second identifier based at least in part on the payment action;
determining, by the at least one computing device, that a payment amount for the payment action has been held for a threshold time period at an entity;
determining, by the at least one computing device, that the payment amount for the payment action has cleared at the entity; and
generating, by the at least one computing device, a user point amount for the user identifier based at least in part on the payment amount being cleared, the identification of the common attribute, and the threshold time period being met.

9. The method of claim 8, further comprising:
adding, by the at least one computing device, the user point amount to an user point account for the user identifier.

10. The method of claim 8, wherein the user point amount is generated based at least in part on a conversion rate associated with the user identifier.

11. The method of claim 10, further comprising:
identifying, by the at least one computing device, a user classification for the user identifier; and
determining, by the at least one computing device, the conversion rate based at least in part on the user classification.

12. The method of claim 8, further comprising:
receiving, by the at least one computing device, a payment request from a client device associated with the user identifier;
determining, by the at least one computing device, that a plurality of source accounts associated with the user identifier and the plurality of source accounts have the common attribute; and
transmitting, by the at least one computing device, the plurality of source accounts to the client device for display.

13. The method of claim 8, further comprising:
determining, by the at least one computing device, that the user identifier has a user point account in response to the payment request.

14. The method of claim 8, wherein the common attribute is a routing identifier of the entity, wherein the first identifier comprises the routing identifier and the second identifier comprises the routing identifier.

15. A non-transitory, computer-readable medium, comprising machine-readable instructions that, when executed by a processor of a computing device, cause the computing device to at least:
determine a user identifier meets an eligible condition associated with an owed balance associated with the user identifier;
transmit to a client device of the user identifier a notification that includes a deep link for directing the client device to display a user interface based at least in part on the user identifier meeting the eligible condition, the deep link comprising an instruction for retrieving payment action data associated with the user identifier to be pre-populated into the user interface, wherein the client device is configured to receive a selection of the deep link from the notification and activate the deep link in response to the selection, wherein in response to the activation of the deep link, the client device causes a client application to pre-populate the payment action data in the user interface;
receive the payment action data from the client device associated with the user identifier;
identify a payment action for the owed balance assigned to the user identifier based at least in part on the payment action data, the payment action comprising a first identifier for a source account and a second identifier for the owed balance;
identify a common attribute between the first identifier and the second identifier based at least in part on the payment action;
determine that a payment amount for the payment action has been held for a threshold time period at an entity;
determine that the payment amount for the payment action has cleared at the entity; and
generate a user point amount for the user identifier based at least in part on the payment amount being cleared, the identification of the common attribute, and the threshold time period being met.

16. The non-transitory, computer-readable medium of claim 15, wherein the machine-readable instructions, when executed by the processor, further cause the computing device to at least:
add the user point amount to a user point account for the user identifier.

17. The non-transitory, computer-readable medium of claim 15, wherein the user point amount is generated based at least in part on a conversion rate associated with the user identifier.

18. The non-transitory, computer-readable medium of claim 17, wherein the machine-readable instructions, when executed by the processor, further cause the computing device to at least:
identify a user classification for the user identifier; and
determine the conversion rate based at least in part on the user classification.

19. The non-transitory, computer-readable medium of claim 15, wherein the machine-readable instructions, when executed by the processor, further cause the computing device to at least:
receive a payment request from a client device associated with the user identifier;
determine that a plurality of source accounts associated with the user identifier and the plurality of source accounts have the common attribute; and
transmit the plurality of source accounts to the client device for display.

20. The non-transitory, computer-readable medium of claim 15, wherein the machine-readable instructions, when executed by the processor, further cause the computing device to at least:
determine that the user identifier has a user point account in response to the payment request.

* * * * *